(12) United States Patent
Liu et al.

(10) Patent No.: US 7,773,492 B2
(45) Date of Patent: Aug. 10, 2010

(54) METHOD AND APPARATUS PROVIDING HIGH DENSITY DATA STORAGE

(75) Inventors: Jun Liu, Boise, ID (US); Mike Violette, Boise, ID (US); Gurtej Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1080 days.

(21) Appl. No.: 11/405,637

(22) Filed: Apr. 18, 2006

(65) Prior Publication Data

US 2007/0242500 A1    Oct. 18, 2007

(51) Int. Cl.
*G11B 9/00* (2006.01)
(52) U.S. Cl. .................................................. 369/126
(58) Field of Classification Search .............. 369/126
See application file for complete search history.

(56) References Cited

U.S. PATENT DOCUMENTS

| | | | |
|---|---|---|---|
| 5,162,819 A * | 11/1992 | Sakai et al. | 347/112 |
| 6,838,692 B1 * | 1/2005 | Lung | 257/4 |
| 7,209,429 B2 * | 4/2007 | Gidon et al. | 369/126 |
| 7,268,794 B2 * | 9/2007 | Honda et al. | 347/224 |
| 7,463,573 B2 * | 12/2008 | Fan et al. | 369/126 |

OTHER PUBLICATIONS

Vettiger et al., The "Millipede"—More than one thousand tips for future AFM data storage, IBM J. Res. Develop., vol. 44, No. 3, May 2000, pp. 323-340.
Goldstein, Harry, The Race to the Bottom: Can a Polymath Engineer Beat IBM to Market with The World's First Consumer Nano Device?, Mar. 21, 2006, pp. 1-12.

* cited by examiner

*Primary Examiner*—Thang V Tran
(74) *Attorney, Agent, or Firm*—Dickstein Shapiro LLP

(57) ABSTRACT

A data storage device and methods for storing and reading data are provided. The data storage device includes a data storage medium and second device. The data storage medium has an insulating layer, a first electrode layer over the insulating layer and at least one layer of resistance variable material over the first electrode layer. The second device includes a substrate and at least one conductive point configured to electrically contact the data storage medium.

35 Claims, 4 Drawing Sheets

US 7,773,492 B2

METHOD AND APPARATUS PROVIDING HIGH DENSITY DATA STORAGE

FIELD OF THE INVENTION

The invention relates to the field of data storage devices, particularly devices formed using a resistance variable material.

BACKGROUND OF THE INVENTION

The maximum data density that can be achieved by magnetic storage media is limited to 60-100 Gb/inch$^2$ by the superparamagnetic limit. Alternatives to magnetic storage media are needed to further increase data density.

One such alternative developed by IBM Research is the "millipede" high-density data storage system. The millipede system is based on micromechanical structures taken from atomic force microscopy (AFM). Data is written as depressions in a polymer medium by a thermomechanical AFM probe. The data is also read and erased by the same probe. The millipede system includes an array of probes that operate in a highly parallel manner, so that each individual probe capable reads, writes and erases data in a small area. See, Vettiger et al., "The 'Millipede'—More than one thousand tips for future AFM data storage," IBM J. RES. DEVELOP., vol. 44, no. 3, pp. 323-339 (May 2000), which is incorporated herein by reference, for additional details regarding this technology.

This technology, however, has a number of drawbacks. Since the technology uses an indentation in the polymer medium to record data and a thermal conduction sensing scheme to read the data, it requires very good temperature control of the array and polymer medium between read and write cycles. Specifically, the temperature of the probe array chip must be maintained at 350° C. As a result, large energy consumption is expected due to heat loss. Also, the technology requires critical material selection with matching thermal expansion coefficients. Additionally, data bit size is limited to 40 nm by the size of the AFM probes as well as the indentation profile the probes create in the polymer media. Accordingly, data density, while increased over magnetic storage media, is limited to 500 Gb/inch$^2$. Furthermore, read and write processes are slow, limited by the maximum resonant frequency of the cantilever probes, which are only operable on a microsecond scale.

Accordingly, a data storage device and system having increased data density is needed.

DETAILED DESCRIPTION OF THE INVENTION

In the following detailed description, reference is made to various specific embodiments of the invention. These embodiments are described with sufficient detail to enable those skilled in the art to practice the invention. It is to be understood that other embodiments may be employed, and that various structural, logical and electrical changes may be made without departing from the spirit or scope of the invention.

The term "substrate" used in the following description may include any supporting structure including, but not limited to, a semiconductor substrate that has an exposed substrate surface. A semiconductor substrate should be understood to include silicon-on-insulator (SOI), silicon-on-sapphire (SOS), doped and undoped semiconductors, epitaxial layers of silicon supported by a base semiconductor foundation, and other semiconductor structures. When reference is made to a semiconductor substrate or wafer in the following description, previous process steps may have been utilized to form regions or junctions in or over the base semiconductor or foundation. The substrate need not be semiconductor-based, but may be any support structure suitable for supporting an integrated circuit, including, but not limited to, metals, alloys, glasses, polymers, ceramics, and any other supportive materials as is known in the art. Additionally, for purposes of this specification, a substrate can include layers and structures over a semiconductor substrate, wafer, or other material, such as conductive lines and/or insulating layers.

Figure 1:
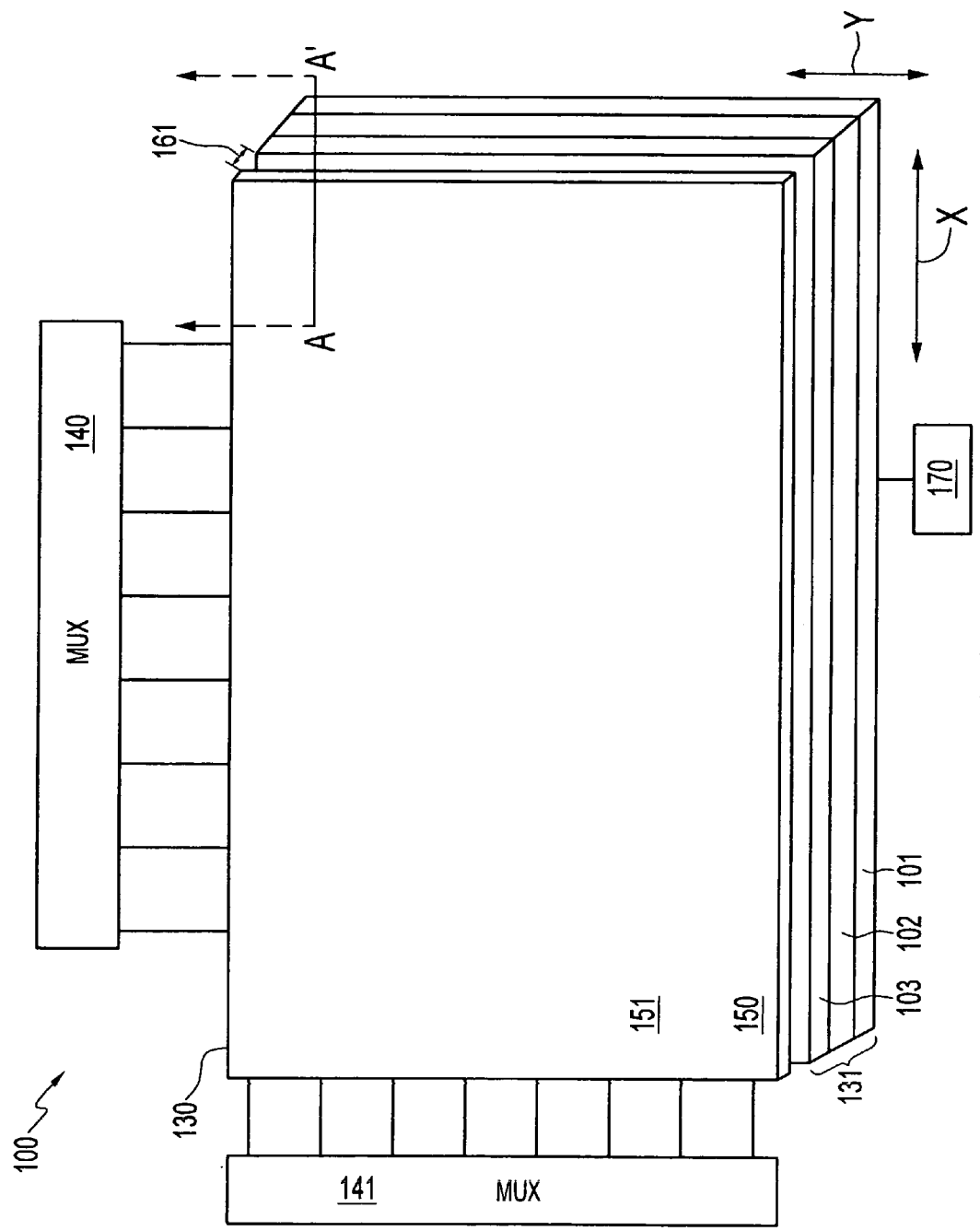
FIG. 1 is a diagram of a data storage device according to an exemplary embodiment of the invention.

The invention is now explained with reference to the figures, which illustrate exemplary embodiments and throughout which like reference numbers indicate like features. FIG. 1 illustrates a high density resistance variable data storage device 100 according to an exemplary embodiment of the invention. The device 100 includes a programming/sensing chip 130 and a data medium 131. The programming/sensing chip 130 is connected to first and second multiplexer circuits 140, 141 (described below in more detail). The data storage medium 131 is connected to a scanner device 170 (described below in more detail).

The data storage medium 131 includes an insulating layer 101, a first electrode layer 102 and a resistance variable material portion 103. This first electrode layer 102 is preferably tungsten (W), but could be any other suitable conductive material, such as silver (Ag).

Figure 2A:
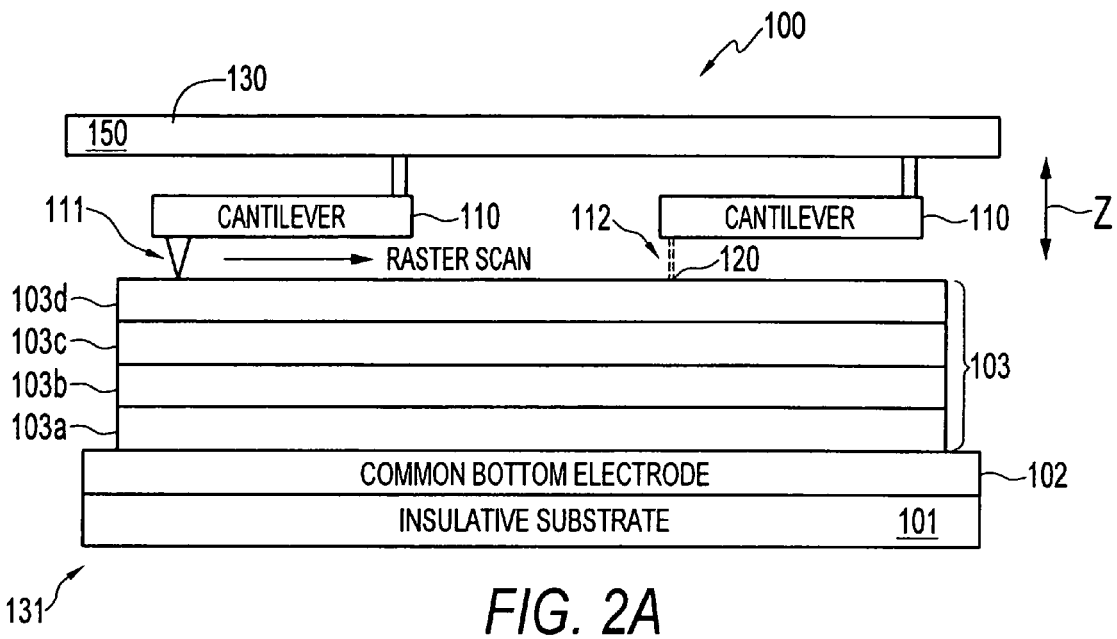
FIGS. 2A and 3A are cross-sectional views of the device of FIG. 1 according to exemplary embodiments of the invention.
Figure 3A:
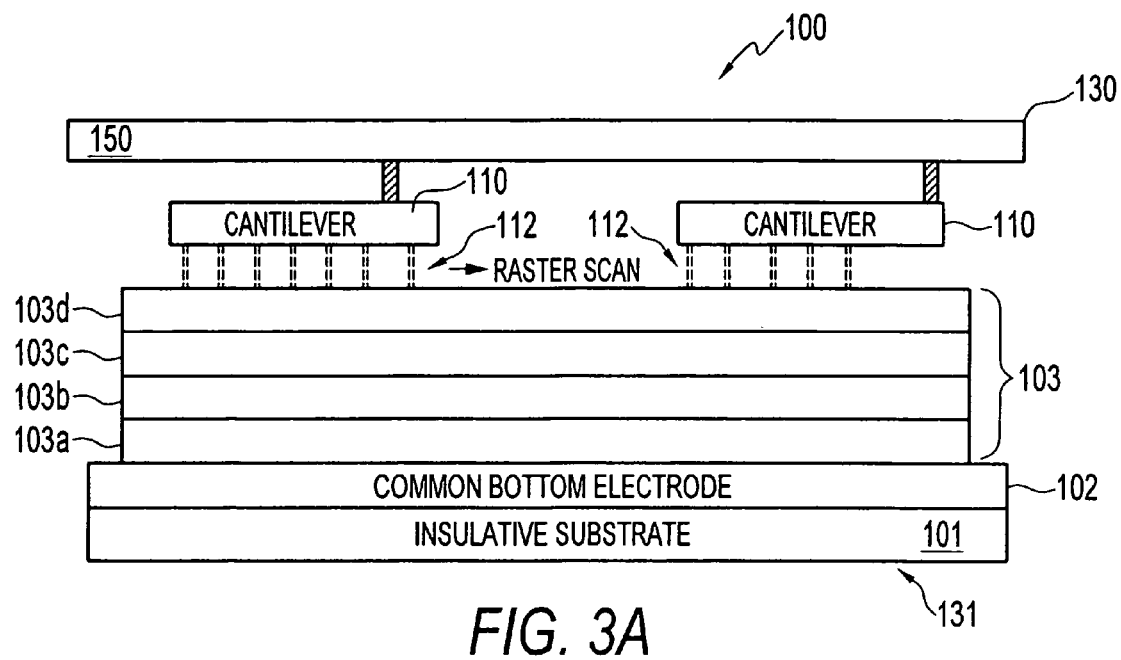

FIGS. 2A and 3A are cross-sectional views of the device 100 along the line A-A' and according to exemplary embodiments of the invention. In both of the FIG. 2A and FIG. 3A embodiments, the resistance variable portion 103 includes one or more layers of resistance variable material and may include layers of additional materials. In the illustrated embodiments, the resistance variable portion 103 includes a chalcogenide material layer 103a, a metal layer 103b, a metal-chalcogenide layer 103c, and a chalcogenide material layer 103d. The chalcogenide material layers 103a, 103d can be, for example, germanium selenide ($Ge_xSe_{100-x}$) glass. The germanium selenide may be within a stoichiometric range of about $Ge_{33}Se_{67}$ to about $Ge_{60}Se_{40}$. Chalcogenide layers 103a, 103d can be a same material or different materials. Further, each layer 103a, 103d need not be a single layer, but may also be comprised of multiple chalcogenide sub-layers having the same or different stoichiometries.

Below the chalcogenide material layer 103d is a layer of metal-chalcogenide 103c, such as tin-chalcogenide (e.g., tin selenide) or a silver chalcogenide (e.g., silver selenide). It is also possible that other chalcogenide materials may be substituted for selenium, such as sulfur, oxygen, or tellurium. The thickness of layer 103c depends, in part, on the thickness of the chalcogenide material layer 103d. The ratio of the thickness of the metal-chalcogenide layer 103c to that of the chalcogenide material layer 103d is preferably between about 5:1 and about 1:3.

An optional metal layer 103b is provided between the chalcogenide material layer 103a and the metal-chalcogenide layer 103c, with silver (Ag) being a suitable exemplary metal.

The layers 103a-d are exemplary only and the resistance variable portion 103 can include different materials and/or different numbers of layers. For example, other resistance variable materials can be used for one or both of layers 103a, 103d, including, as non-limiting examples, other chalcogenide glasses; chalcogenide glasses comprising a metal, such as silver, tin, copper, among others; amorphous carbon. Also, the resistance variable portion 103 can include the materials and layering structures discussed in various patents and patent applications assigned to Micron Technology, Inc., including, but not limited to the following: U.S. patent application Ser. No. 10/765,393; U.S. patent application Ser. No. 09/853,233; U.S. patent application Ser. No. 10/022,722; U.S. patent application Ser. No. 10/663,741; U.S. patent application Ser. No. 09/988,984; U.S. patent application Ser. No. 10/121,790; U.S. patent application Ser. No. 09/941,544; U.S. patent application Ser. No. 10/193,529; U.S. patent application Ser. No. 10/100,450; U.S. patent application Ser. No. 10/231,779; U.S. patent application Ser. No. 10/893,299; U.S. patent application Ser. No. 10/077,872; U.S. patent application Ser. No. 10/865,903; U.S. patent application Ser. No. 10/230,327; U.S. patent application Ser. No. 09/943,190; U.S. patent application Ser. No. 10/622,482; U.S. patent application Ser. No. 10/081,594; U.S. patent application Ser. No. 10/819,315; U.S. patent application Ser. No. 11/062,436; U.S. patent application Ser. No. 10/899,010; and U.S. patent application Ser. No. 10/796,000, which are incorporated herein by reference. The resistance variable portion 103 can also be other single layer resistance variable insulating materials, such as colossal magnet resistive films, for example, a PCMO film (e.g., $Pr_{0.7}Cr_{0.3}MoO_3$ or $Ba_{0.6}Sr_{0.4}TiO_3$); oxidation films having Perovskite structure, for example, doped or undoped $BaTiO_3$, $SrTiO_3$; or an oxidation film, for example, $NbO_5$, $TiO_2$, $TaO_5$ and NiO (see U.S. patent application Ser. No. 11/203,141, which is incorporated herein by reference and is assigned to Micron Technology, Inc.).

During operation, data can be written to specific locations on the resistance variable portion 103 by applying a voltage to a desired location on the resistance variable material to form a conductive pathway (e.g., a conduction channel or path) 120, which has a lower resistance than other areas of the resistance variable portion 103. Data is read by applying a voltage pulse of a lesser magnitude than required to program a conductive pathway 120; the resistance across the location of the resistance variable portion 103 is then sensed as higher or lower to define two logic states.

The programmed low resistance conductive pathway 120 can remain intact for an indefinite period, typically years or longer, after the voltage potentials are removed; however, some refreshing may be useful. The conductive pathway 120 can be erased and the specific location of the resistance variable portion 103 can be returned to its higher resistance state by applying a reverse voltage potential of about the same order of magnitude as used to write the location to the lower resistance state. Again, the higher resistance state is maintained in a semi- or non-volatile manner once the voltage potential is removed. Alternatively, the memory portion can be configured to be programmable one time only. In such a case, the conductive pathway 120 will remain indefinitely, but can not be erased.

In this way, the resistance variable portion 103 provides data storage for storing data bits at the locations, each location able to exhibit at least two resistance states, which can define two respective logic states, i.e., at least a bit of data.

The programming/sensing chip 130 is spaced a distance 160 above the data storage medium 131 and includes an array of cantilevers 110 (FIGS. 2A-3B). The cantilevers are affixed to a substrate 150. In the exemplified embodiment, the cantilevers 110 are moveably affixed to the substrate 150 to allow for movement along the z direction. Alternatively, the cantilevers can be stationary. The substrate 150 includes circuitry 151 for operating the individual cantilevers 110 in response to signals from multiplexers 140, 141 as described in more detail below.

Each cantilever 110 is connected to circuitry 151 of the programming/sensing chip 130 for enabling the cantilever 110, and corresponding conductive point(s) 111, 112 to perform the desired read, write and erase functions. In turn, the programming/sensing chip 130 is connected to multiplexing circuitry (MUX) 140, 141 (FIG. 1), for addressing and actuating particular cantilevers 110 and conductive points 111, 112. Once a first set of data is written to a first location (as described above), the conductive points 111, 112 of the cantilevers 110 are then raster-scanned to the next location on the resistance variable portion 103, which is, e.g., about 20 nm to about 50 nm away from the first location, to write a second set of data. The raster scan can be achieved, for example, as in the millipede system, by relative movement of the data storage medium 131 in the x and y directions. Accordingly, in one exemplary embodiment the data storage medium 131 can be connected to a scanner device 170 for providing movement of the data storage medium 131 in the x and y directions. Alternatively, data storage medium 131 can be fixed while the programming/sensing chip 130 is configured for movement in the x and y directions.

As the dimensions in the x and y direction of a conductive pathway (e.g., a conduction channel or path) 120 are very small, the device 100 can achieve a data density of about 2 Tb/inch$^2$. Additionally, the device 100 does not require elevated operation temperatures. Further, the read and programming operations can be fast as it does not involve producing mechanical indentations, a process that is limited by the cantilever's resonant frequency. It has been shown that a 1 ns pulse can cause the formation of a conductive pathway 120.

When a cantilever 110 is actuated, each moves along the z direction such that the conductive point(s) 111, 112 are place in or are removed from electrical contact with the resistance variable portion 103 of the data storage medium 131. Alternatively, the cantilevers 110 can be stationary and the spacing 161 between the data storage medium 131 and the programming/sensing chip 130 can be such that the conductive points 111, 112 of the cantilevers 110 are in constant electrical contact with the resistance variable portion 103. In such a case, when the chips 130, 131 are moved relative to one another, the conductive points 111, 112 can move along the surface of the resistance variable portion 103. Also, when no movement of the conductive points 111, 112 in the z direction is needed, the conductive points need not be included on a cantilever 110, but can instead, for example, be included on a structure connected to the substrate 150 at more than one end or to a structure protruding from the substrate 150.

When addressed, conductive point(s) 111, 112 provide a voltage across a desired location of the resistance variable portion 103 to read, write or erase the location. In this way, each conductive point 111, 112 serves as a second electrode to the first electrode 102.

Figure 2B:
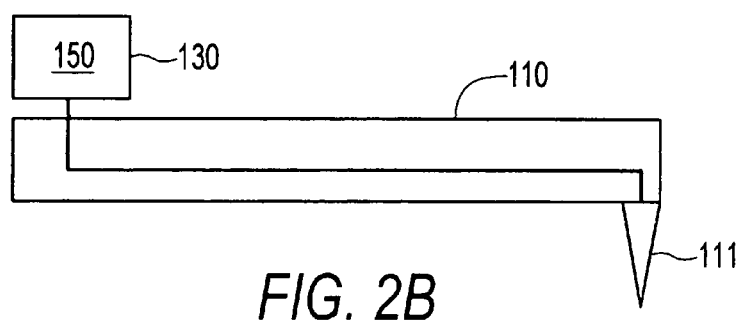
FIG. 2B is a cross-sectional view of the cantilever of FIG. 2A according to exemplary embodiments of the invention.

In the FIG. 2A embodiment, the chip 130 includes an array of cantilevers 110, which are individually addressable by multiplexers 140, 141 through circuitry 151. As shown in FIG. 2B each cantilever includes a single conductive point, which can be, for example, a sharp metal tip 111 (e.g., tungsten or silicon) or a conductive nanotube 112 (e.g., a carbon nanotube) or nanorod (not shown) (e.g., a metal nanorod, such as, a silicon nanorod). Although both sharp metal tips 111 and conductive nanotubes 112 are shown in FIG. 2A, it should be understood that the device 100 could include only a single type of conductive point. The conductive point 111, 112 is connected to the circuitry 151. When addressed, the circuitry 151 causes the cantilever 110 to move such that the conductive point 111, 112 is in electrical contact with the resistance variable portion 130. Additionally, the circuitry 151 provides a voltage to the conductive point 111, 112, which in turn provides a voltage to a location on the resistance variable portion 130.

Figure 3B:
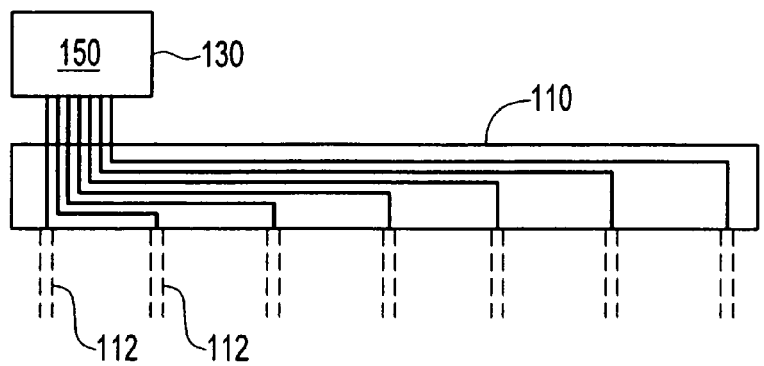
FIG. 3B is a cross-sectional view of the cantilever of FIG. 3A according to exemplary embodiments of the invention.

In the FIG. 3A embodiment, each cantilever 110 includes a plurality of individually addressable conductive tips, e.g., nanotubes 112, as shown in FIG. 3B. Each conductive point 112 is connected to the circuitry 151. When addressed, the circuitry 151 causes the cantilever 110 to move such that the conductive points 112 are in electrical contact with the resistance variable portion 130. Additionally, the circuitry 151 provides a voltage to the conductive points 112, which in turn provide a voltage to locations on the resistance variable portion 130.

Figure 4:
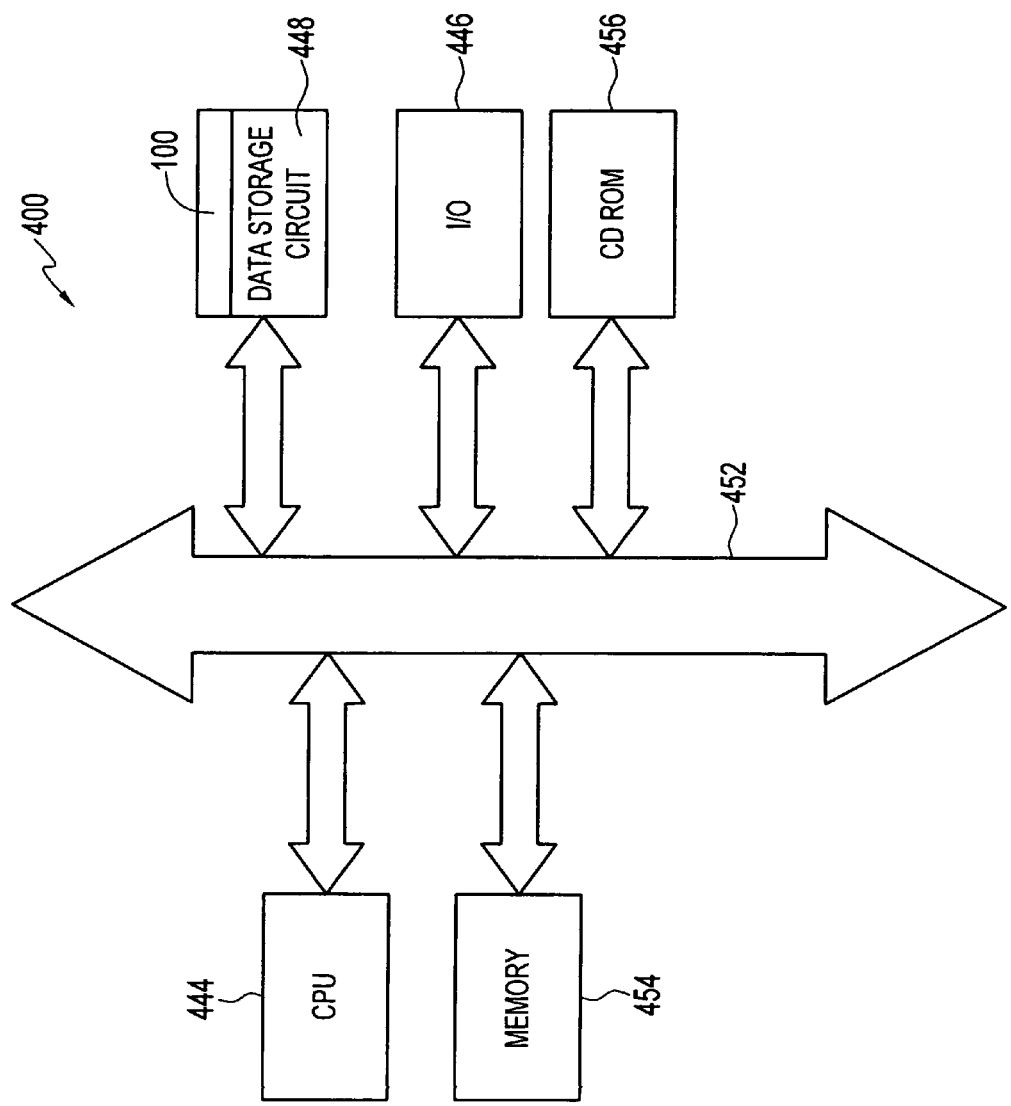
FIG. 4 is a block diagram of a processor system including the device of FIG. 1.

FIG. 4 illustrates a processor system 400 which includes a data storage circuit 448, including a data storage device 100 constructed according to the invention. The processor system 400, which can be, for example, a computer system, generally comprises a central processing unit (CPU) 444, such as a microprocessor, a digital signal processor, or other programmable digital logic devices, which communicates with an input/output (I/O) device 446 over a bus 452. The system 400 may also include a memory unit 454 in communication with the CPU over the bus 452. The data storage circuit 448 communicates with the CPU 444 over bus 452 typically through a controller.

In the case of a computer system, the processor system 400 may include peripheral devices such as a compact disc (CD) ROM drive 456, which also communicate with CPU 444 over the bus 452.

The above description and drawings are only to be considered illustrative of exemplary embodiments, which achieve the features and advantages of the present invention. Modification and substitutions to specific process conditions and structures can be made without departing from the spirit and scope of the present invention. Accordingly, the invention is not to be considered as being limited by the foregoing description and drawings, but is only limited by the scope of the appended claims.

What is claimed as new and desired to be protected by Letters Patent of the United States is:

1. A data storage device comprising:
a first device comprising:
an insulating layer,
a first electrode layer over the insulating layer, and
at least one layer of a chalcogenide material over the first electrode layer and a metal-chalcogenide layer between the first electrode and the chalcogenide material layer; and
a second device comprising:
a substrate, and
at least one conductive point configured to electrically contact the first device.

2. The data storage device of claim 1, wherein the chalcogenide material is $Ge_xSe_z$.

3. The data storage device of claim 1, further comprising a metal layer between the metal-chalcogenide layer and the first electrode.

4. The data storage device of claim 1, wherein the metal layer is silver.

5. The data storage device of claim 1, wherein the metal-chalcogenide layer is silver selenide.

6. The data storage device of claim 1, wherein the metal-chalcogenide layer is tin selenide.

7. The data storage device of claim 1, wherein the first electrode comprises tungsten.

8. The data storage device of claim 1, wherein the at least one conductive point is a metal tip.

9. The data storage device of claim 1, wherein the at least one conductive point is a nanotube.

10. The data storage device of claim 1, wherein the at least one conductive point is a nanorod.

11. The data storage device of claim 1, further comprising a plurality of conductive points.

12. The data storage device of claim 11, wherein each of the plurality of conductive points is individually addressable.

13. The data storage device of claim 1, wherein the at least one conductive point is affixed to the substrate by a cantilever.

14. The data storage device of claim 13, wherein the second chip further comprises circuitry for controlling movement of the cantilever.

15. The data storage device of claim 13, further comprising a plurality of conductive points affixed to the substrate by the cantilever.

16. A processor system comprising:
a processor; and
a data storage device comprising:
a first device comprising:
an insulating layer,
a first electrode layer over the insulating layer, and
at lest one layer of a chalcogenide material over the first electrode layer and a metal-chalcogenide layer between the first electrode and the chalcogenide material layer; and
a second device comprising:
a substrate, and
at least one conductive point configured to electrically contact the first device.

17. The system of claim 16, wherein the chalcogenide material is $Ge_xSe_z$.

18. The system of claim 16, further comprising a metal layer between the metal-chalcogenide layer and the first electrode.

19. The data storage device of claim 16, wherein the at least one conductive point is affixed to the substrate by a cantilever.

20. The system of claim 19, further comprising a plurality of individually addressable conductive points affixed to the substrate by the cantilever.

21. The system of claim 16, wherein the data storage device is configured to have a data storage density of about 2 Tb/inch$^2$.

22. The system of claim 16, wherein the data storage device is configured to have a data storage density of greater than about 500 Gb/inch$^2$.

23. The system of claim 19, wherein the second device further comprises circuitry for controlling movement of the cantilever.

24. The system of claim 16, further comprising a scanner device for enabling movement of at least one of the first and second devices relative to the other of the first and second devices.

25. The system of claim 24, wherein the scanner device is configured to enable movement of both the first and second devices.

26. A data storage device comprising:
   a first device comprising:
   an insulating layer,
   a first electrode layer over the insulating layer, and
   at least one layer of a resistance variable material over the first electrode layer; and
   a second device comprising:
   a substrate, and
   at least one conductive point configured to directly contact the resistance variable material layer.

27. The data storage device of claim 26, wherein the resistance variable material comprises a PCMO film.

28. The data storage device of claim 26, wherein the resistance variable material comprises an oxidation film.

29. The data storage device of claim 28, wherein the oxidation film has a Perovskite structure.

30. The data storage device of claim 26, wherein the resistance variable material comprises any one of doped or undoped $BaTiO_3$, $SrTiO_3$ or $SrZrO_3$.

31. The data storage device of claim 26, wherein the resistance variable material selected from the group consisting of $Pr_{0.7}Cr_{0.3}MoO_3$, $Nb_2O_5$, $TiO_2$, $TaO_5$, and NiO.

32. The data storage device of claim 26, wherein the at least one conductive point is affixed to the substrate by a cantilever.

33. A method for operating a data storage device, the method comprising:
   providing one of a resistance variable film and a chalcogenide material layer;
   providing a first electrode layer in electrical communication with the resistance variable film or the chalcogenide material layer;
   forming a first conductive pathway at a first location in the resistance variable film or the chalcogenide material layer by applying a first voltage across the first location, the first voltage being applied through a conductive point; and forming a second conductive pathway at a second location in the resistance variable film or the chalcogenide material layer by applying a second voltage across the second location, the second voltage being applied through the conductive point; and
   detecting a resistance state at the first location by applying a third voltage at the first location, the third voltage being applied through the conductive point.

34. A method for operating a data storage device, the method comprising:
   providing one of a resistance variable film and a chalcogenide layer;
   providing a first electrode layer in electrical communication with the resistance variable film or the chalcogenide layer;
forming a first conductive pathway at a first location in the resistance variable film or the chalcogenide layer by applying a first voltage across the first location, the first voltage being applied through a conductive point; and forming a second conductive pathway at a second location in the resistance variable film or the chalcogenide layer by applying a second voltage across the second location, the second voltage being applied through the conductive point, wherein the first and second locations are between about 20 nm to about 50 nm apart.

35. The method of claim 33, wherein the conductive point is included in a first device and the chalcogenide material layer or resistance variable film is included in a second device, and further comprising moving at least one of the first and second devices relative to the other of the first and second devices.

* * * * *